(12) United States Patent
Tiwari et al.

(10) Patent No.: US 12,729,985 B2
(45) Date of Patent: Sep. 8, 2026

(54) MACHINE LOGIC MULTI-PHASE METERING USING DISTRIBUTED ACOUSTIC SENSING DATA

(71) Applicant: ConocoPhillips Company, Houston, TX (US)

(72) Inventors: Upendra K. Tiwari, Houston, TX (US); Baishali Roy, Houston, TX (US); Nan Ma, Houston, TX (US); Ge Jin, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 974 days.

(21) Appl. No.: 17/983,699

(22) Filed: Nov. 9, 2022

(65) Prior Publication Data

US 2023/0160726 A1 May 25, 2023

Related U.S. Application Data

(60) Provisional application No. 63/277,257, filed on Nov. 9, 2021.

(51) Int. Cl.

*G06F 11/30* (2006.01)
*E21B 47/07* (2012.01)
*G01D 5/353* (2006.01)
*G01F 1/661* (2022.01)

(52) U.S. Cl.

CPC ......... *G01D 5/35361* (2013.01); *E21B 47/07* (2020.05); *G01F 1/661* (2013.01)

(58) Field of Classification Search

CPC ................................................. G01D 5/35361

See application file for complete search history.

(56) References Cited

U.S. PATENT DOCUMENTS

| | | | | |
|---|---|---|---|---|
| 2016/0281494 | A1* | 9/2016 | Shirdel | E21B 33/12 |
| 2018/0231498 | A1* | 8/2018 | Amir | G01N 29/2418 |
| 2021/0302405 | A1* | 9/2021 | Al Shahri | G01F 25/10 |
| 2021/0340869 | A1* | 11/2021 | Syresin | E21B 49/0875 |

OTHER PUBLICATIONS

International Search Report and the Written Opinion of the International Searching Authority, or the Declaration for International Application No. PCT/US 22/49378 dated Feb. 14, 2023 (13 pages).

(Continued)

*Primary Examiner* — Phuong Huynh

(74) *Attorney, Agent, or Firm* — Polsinelli PC

(57) ABSTRACT

A method for predicting fluid fractions is provided. The method includes building, from pressure, temperature, a fluid speed parameter, speed of sound, and fluid fractions of a first fluid flow, a machine learning model programmed to estimate fluid fractions of a fluid flow as a function of at least one Distributed Acoustic Sensing ("DAS") fluid flow parameter and at least one physical characteristic of the fluid flow; receiving at least one DAS fluid flow parameter and the at least one physical characteristic of a second fluid flow; and determining, using the machine learning model, fluid fractions of the second fluid flow from at least the at least one DAS fluid flow parameter for the second fluid flow and the at least one physical characteristic of the second fluid flow.

20 Claims, 7 Drawing Sheets

(56) References Cited

OTHER PUBLICATIONS

Ahmed Bukhamsin et al: "SPE-170679-MS Using Distributed Acoustic Sensors to Optimize Production in Intelligent Wells", Oct. 27, 2014 (Oct. 27, 2014), XP055199944.
Extended European Search Report for Application No. 22893547.4 dated Sep. 8, 2025 (8 pages).
G. Naldrett et al: "Production Monitoring Using Next-Generation Distributed Sensing Systems", Petrophysics, vol. 59, No. 4, Aug. 1, 2018 (Aug. 1, 2018), pp. 496-510, XP055604512.

* cited by examiner

MACHINE LOGIC MULTI-PHASE METERING USING DISTRIBUTED ACOUSTIC SENSING DATA

CROSS-REFERENCE TO RELATED APPLICATIONS

The present application claims priority to U.S. Patent Provisional Application 63/277,257 filed on Nov. 9, 2021, which is incorporated by reference in its entirety herein.

FIELD

Aspects of the presently disclosed technology relate generally to logging techniques used in oil and gas recovery operations and more specifically to systems and methods for estimating multi-phase fluid fractions using machine learning techniques.

BACKGROUND

Oil, gas, and other similar wells utilize well logging surveys to determine the fluid fraction (relative amounts) of oil, gas, and unwanted water present in the production zone. This data, along with measurements of the fluid flow velocity, porosity, cross-section of the well, pressure, and temperature, may be used to determine production rates and other information from each zone of interest in the well. Such data is useful for optimizing the well's production, oil recovery, water shut-off and/or fracturing sequence, to achieve better reservoir management and reduce intervention costs. A well log can also be used to identify inefficiency with the well or optimize well and asset management decisions. However, it is difficult to obtain accurate estimates of fluid fractions. It is with these observations in mind, among others, that various aspects of the presently disclosed technology were conceived and developed.

SUMMARY

Implementations claimed and described herein address the forgoing by providing systems and methods for estimating multi-phase fluid fractions. In one implementation, a method includes: first measuring, by a pressure sensor, a pressure of a first fluid flow; second measuring, by a temperature sensor, a temperature of the first fluid flow; first determining, by distributed acoustic sensing (DAS), a fluid speed parameter of the first fluid flow and a speed of sound through the first fluid flow; second determining, by a well-test separator and/or a multi-phase sensor, fluid fractions of the first fluid flow; building, from the measured pressure of a first fluid flow, the measured temperature of the first fluid flow, the determined fluid speed parameter of the first fluid flow, the speed of sound through the first fluid flow, and the determined fluid fractions of the first fluid flow, a machine learning model programmed to estimate fluid fractions of a fluid flow as a function of at least one DAS fluid flow parameter and at least one physical characteristic of the fluid flow; receiving data for a second fluid flow, the data including the at least one DAS fluid flow parameter for the second fluid flow and the at least one physical characteristic of the second fluid flow; and determining, using the machine learning model, fluid fractions of the second fluid flow from at least the at least one DAS fluid flow parameter for the second fluid flow and the at least one physical characteristic of the second fluid flow.

The above implementation may have various features. The building may comprise using, as training data for the machine learning model, at least the measured pressure of a first fluid flow, the measured temperature of the first fluid flow, the determined fluid speed parameter of the first fluid flow, the speed of sound through the first fluid flow; and comparing output of the machine learning model for the training data to the determined fluid fractions of the first fluid flow from the well-test separator and/or the multi-phase sensor. The at least one DAS fluid flow parameter may include a fluid speed parameter of the second fluid flow and speed of sound through the second fluid flow. The fluid speed parameter may be a fluid velocity and/or fluid rate. The at least one physical characteristic of the second fluid flow may include a pressure and temperature of the second fluid flow. The first determining may include: deploying a length of fiber optic cable along a fluid pathway; monitoring changes in light through the fiber optic cable induced by movement of the first fluid flow through the fluid pathway; and calculating, from at least the changes, the fluid speed parameter of the first fluid flow and the speed of sound through the first fluid flow. The first determining may include: deploying a length of fiber optic cable along at least a portion of a fluid pathway, the length of the cable having portions wound around a pipe carrying the first fluid flow; monitoring changes in light through the fiber optic cable induced by movement of the first fluid flow through the fluid pathway; and calculating, from at least the changes, the fluid speed parameter of the first fluid flow and the speed of sound through the first fluid flow.

In another implementation, a non-transitory computer readable media stores instructions programmed to cooperate with a processor of electronic computer hardware and software to perform operations including: first measuring, by a pressure sensor, a pressure of a first fluid flow; second measuring, by a temperature sensor, a temperature of the first fluid flow; first determining, by distributed acoustic sensing (DAS), a fluid speed parameter of the first fluid flow and a speed of sound through the first fluid flow; second determining, by a well-test separator and/or a multi-phase sensor, fluid fractions of the first fluid flow; building, from the measured pressure of a first fluid flow, the measured temperature of the first fluid flow, the determined fluid speed parameter of the first fluid flow, the speed of sound through the first fluid flow, and the determined fluid fractions of the first fluid flow, a machine learning model programmed to estimate fluid fractions of a fluid flow as a function of at least one DAS fluid flow parameter and at least one physical characteristic of the fluid flow; receiving data for a second fluid flow, the data including the at least one DAS fluid flow parameter for the second fluid flow and the at least one physical characteristic of the second fluid flow; and determining, using the machine learning model, fluid fractions of the second fluid flow from at least the at least one DAS fluid flow parameter for the second fluid flow and the at least one physical characteristic of the second fluid flow.

The above implementation may have various features. The building may comprise using, as training data for the machine learning model, at least the measured pressure of a first fluid flow, the measured temperature of the first fluid flow, the determined fluid speed parameter of the first fluid flow, the speed of sound through the first fluid flow; and comparing output of the machine learning model for the training data to the determined fluid fractions of the first fluid flow from the well-test separator and/or the multi-phase sensor. The at least one DAS fluid flow parameter may include a fluid speed parameter of the second fluid flow and speed of sound through the second fluid flow. The fluid speed parameter may be a fluid velocity and/or fluid rate. The at least one physical characteristic of the second fluid flow may include a pressure and temperature of the second fluid flow. The first determining may include: deploying a length of fiber optic cable along a fluid pathway; monitoring changes in light through the fiber optic cable induced by movement of the first fluid flow through the fluid pathway; and calculating, from at least the changes, the fluid speed parameter of the first fluid flow and the speed of sound through the first fluid flow. The first determining may include: deploying a length of fiber optic cable along at least a portion of a fluid pathway, the length of the cable having portions wound around a pipe carrying the first fluid flow; monitoring changes in light through the fiber optic cable induced by movement of the first fluid flow through the fluid pathway; and calculating, from at least the changes, the fluid speed parameter of the first fluid flow and the speed of sound through the first fluid flow.

In another implementation, a system includes: a pressure sensor located in a fluid pathway; a temperature sensor located in the fluid pathway; a distributed acoustic sensing (DAS) unit receiving data from at least one fiber optic cable in the fluid pathway and being programmed to calculate a fluid speed parameter of fluid in the fluid pathway and a speed of sound through fluid in the fluid pathway; a well-test separator and/or a multi-phase sensor located in the fluid pathway; a processor having a combination of electronic computer hardware and software; and a memory storing instructions programmed to cooperate with the processor to perform operations. The operations include: building, from a pressure of a first fluid flow from the pressure sensor, a temperature of the first fluid flow from the temperature sensor, a fluid speed parameter of the first fluid flow from the DAS, a speed of sound through the first fluid flow from the DAS, and a fluid fraction of the first fluid flow from the well-test separator and/or a multi-phase sensor, a machine learning model programmed to estimate fluid fractions of fluid flow as a function of at least one DAS fluid flow parameter and at least one physical characteristic of the fluid flow; receiving data for a second fluid flow, the data including the at least one DAS fluid flow parameter for the second fluid flow and the at least one physical characteristic of the second fluid flow; and determining, using the machine learning model, fluid fractions of the second fluid flow from at least the at least one DAS fluid flow parameter for the second fluid flow and the at least one physical characteristic of the second fluid flow.

The above implementation may have various optional features. The building may include: using, as training data for the machine learning model, at least the pressure from the pressure sensor, the temperature from the temperature sensor, the fluid speed parameter from the DAS, the speed of sound from the DAS; and comparing output of the machine learning model for the training data to the determined fluid fractions of the first fluid flow from the well-test separator and/or the multi-phase sensor. The at least one DAS fluid flow parameter may include a fluid speed parameter of the second fluid flow and speed of sound through the second fluid flow. The fluid speed parameter may include fluid velocity and/or fluid rate. The at least one physical characteristic of the second fluid flow may include a pressure and temperature of the second fluid flow. A length of fiber optic cable may be extend along at least a portion of the fluid pathway. The DAS unit may be being programmed to: monitor changes in light through the fiber optic cable induced by movement of fluid through the fluid pathway; and calculate, from at least the changes, the fluid speed parameter and the speed of sound. The foregoing is intended to be illustrative and is not meant in a limiting sense. Many features of the implementations may be employed with or without reference to other features of any of the implementations. Additional aspects, advantages, and/or utilities of the presently disclosed technology will be set forth in part in the description that follows and, in part, will be apparent from the description, or may be learned by practice of the presently disclosed technology.

BRIEF DESCRIPTION OF THE DRAWINGS

In order to describe the manner in which the above-recited and other advantages and features of the disclosure can be obtained, a more particular description of the principles briefly described above will be rendered by reference to specific example implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1:
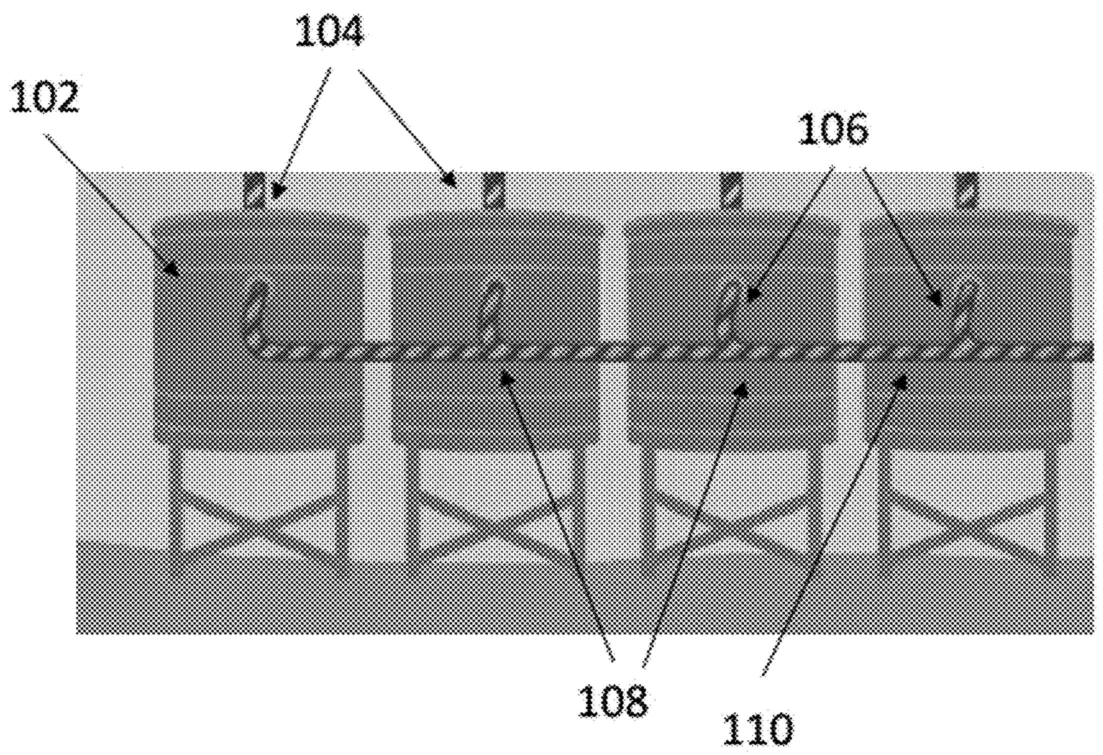
FIG. 1 shows an implementation of an above-surface fiber optic sensor deployment.

In the following description, various implementations will be illustrated by way of example and not by way of limitation in the figures of the accompanying drawings. References to various implementations in this disclosure are not necessarily to the same implementation, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Specific details are provided in the following description to provide a thorough understanding of implementations. However, it will be understood by one of ordinary skill in the art that implementations may be practiced without these specific details. For example, systems may be shown in block diagrams so as not to obscure the implementations in unnecessary detail. In other instances, well-known processes, structures and techniques may be shown without unnecessary detail in order to avoid obscuring example implementations.

References to one or an implementation in the present disclosure can be, but not necessarily are, references to the same implementation; and, such references mean at least one of the implementations.

References to any "example" herein (e.g., "for example", "an example of", by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various implementations given in this specification.

Without intent to limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized means "including, but not necessarily limited to"; it specifically indicates open-ended inclusion or membership in the so-described combination, group, series and the like. The term "a" means "one or more" unless the context clearly indicates a single element. The term "about" when used in connection with a numerical value means a variation consistent with the range of error in equipment used to measure the values, for which+5% may be expected. "First," "second," etc., re labels to distinguish components or blocks of otherwise similar names but does not imply any sequence or numerical limitation. "And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the term "front", "rear", "left," "right," "top" and "bottom" or other terms of direction, orientation, and/or relative position are used for explanation and convenience to refer to certain features of this disclosure. However, these terms are not absolute, and should not be construed as limiting this disclosure.

All temperatures herein are in Celsius unless otherwise specified.

Shapes as described herein are not considered absolute. As is known in the art, surfaces often have waves, protrusions, holes, recesses, etc. to provide rigidity, strength and functionality. All recitations of shape (e.g., cylindrical) herein are to be considered modified by "substantially" regardless of whether expressly stated in the disclosure or claims, and specifically accounts for variations in the art as noted above.

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

General Architecture

Distributed Acoustic Sensing ("DAS") employs a measure of Rayleigh scatter distributed along the fiber optic cable. A coherent laser pulse from an interrogator is sent along the optic fiber and scattering sites within the fiber itself causes the fiber to act as a distributed interferometer with a pre-set gauge length. Thus, interactions between the light and material of the fiber can cause light to backscatter and return to the input end, where it is detected and analyzed. Acoustic waves, when interacting with the materials that comprise the optical fiber, create small dynamic density changes, thus affecting the refractive index of the fiber optic cable. These changes affect the backscatter characteristics, thus becoming detectable events.

It is difficult to obtain accurate estimates of fluid fractions. For example, multi-phase flow meter installed on the surface pipeline is expensive, with each flow meter costing on the order of $1 million. A less expensive approach is to use well-test separators. A drawback of separators is that when one separator meters multiple wells (e.g., more than 20 wells per separator), each well is metered at a rate of about one per month. This sampling rate is insufficient data to determine well health and fluid volume allocation.

Compared with electronic-based sensing tools, fiber-optic sensing has many advantages. First, all the sensing instruments are at the surface, so there is no power supply, moving parts, or electronics required in the borehole. Also, fiber-optic sensing can provide measurements along the entire fiber length (as long as 10 miles) with a spatial resolution in terms of feet. Thus, it can cover the entire wellbore simultaneously without having to move the tools. Finally, the diameter of the sensing fibers is usually in the range of millimeters, which can be easily integrated into the existing wireline, coil tubing, or carbon-rod cables, and they can be easily protected to endure harsh borehole environments.

Optical fibers may be used in a variety of logging tools. For example, Distributed Acoustic Sensing ("DAS") that employs a measure of Rayleigh scatter distributed along the fiber optic cable may be used. A coherent laser pulse from an interrogator is sent along the optic fiber, and scattering sites within the fiber itself causes the fiber to act as a distributed interferometer with a pre-set gauge length. Thus, interactions between the light and material of the fiber can cause a small amount of light to backscatter and return to the input end, where it is detected and analyzed. Acoustic waves, when interacting with the materials that comprise the optic fiber, create small dynamic density changes, thus affecting the refractive index of the fiber optic cable. These changes affect the backscatter characteristics, thus becoming detectable events. Using time-domain techniques, event location is precisely determined, providing fully distributed sensing within one meter or less resolution. As described in more detail herein, the presently disclosed technology has high spatial and temporal resolution while retaining the ability to provide real-time "snap shots" of the production zone's fluid allocation.

Figure 2:
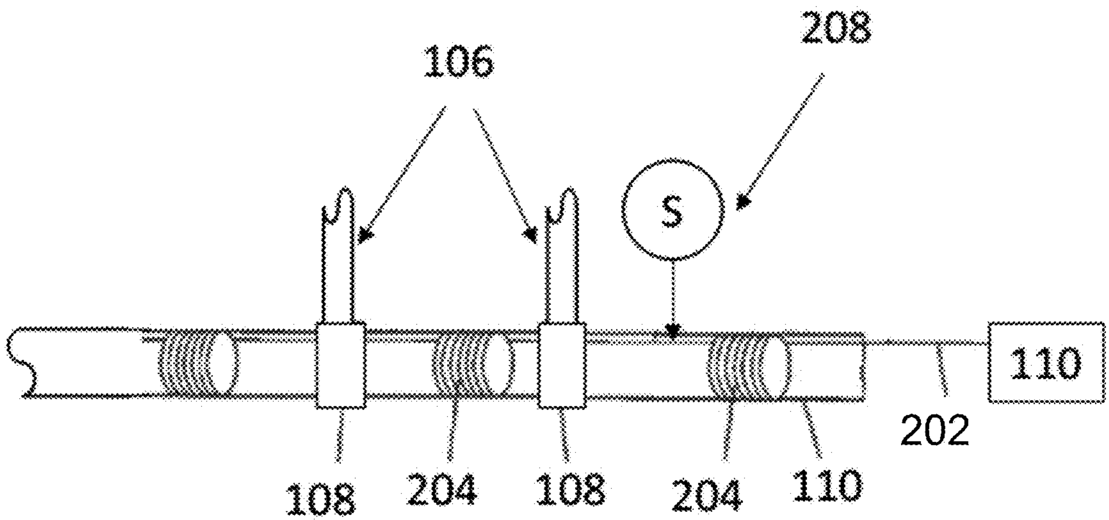
FIG. 2 shows an implementation of components of the above-surface fiber optic sensor deployment of FIG. 1.
Figure 3:
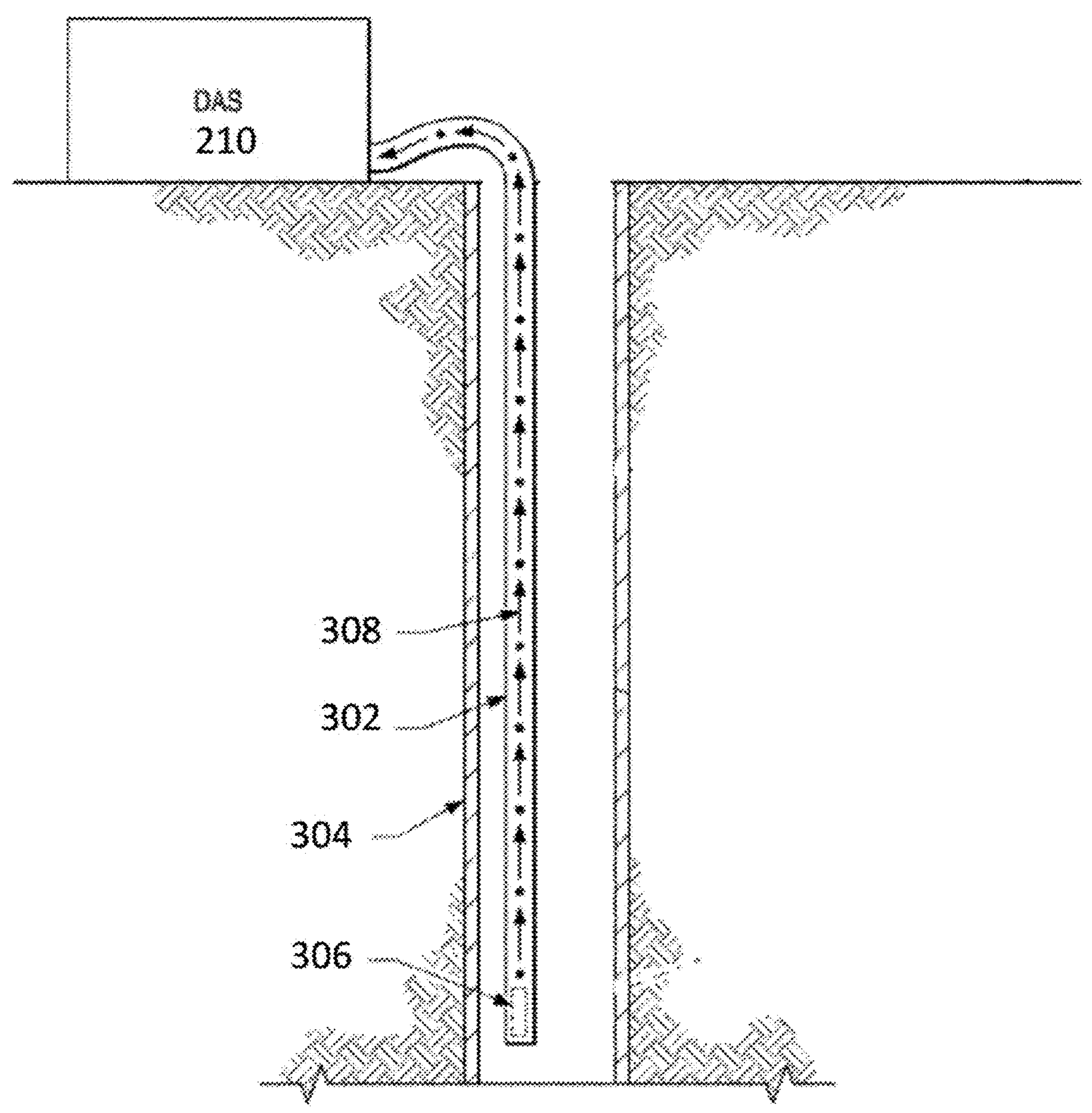
FIG. 3 shows an implementation of a below-surface fiber optic sensor deployment.
Figure 4:
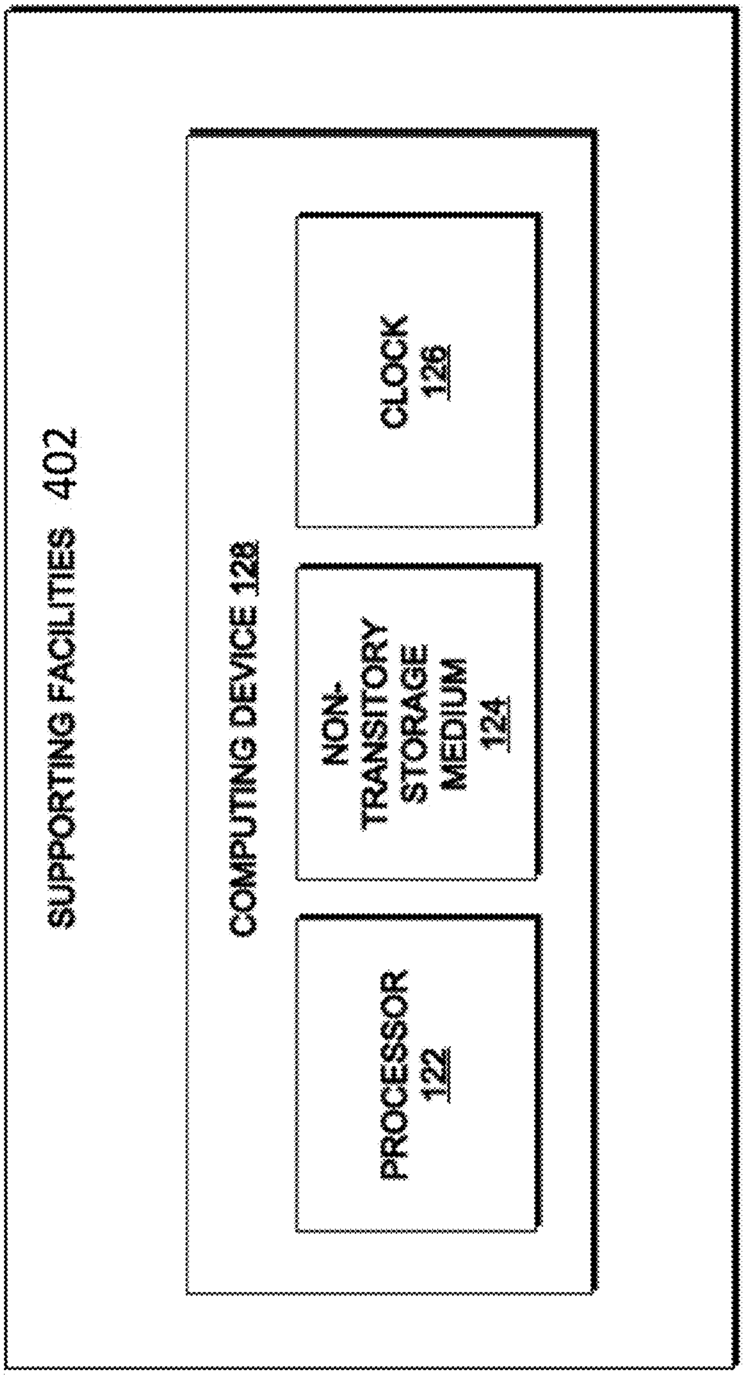
FIG. 4 shows supporting facilities for the fiber optic sensor deployment of FIGS. 1-3.

FIGS. 1-4 show various non-limiting examples of DAS deployments, with FIGS. 1-2 showing above-surface applications, FIG. 3 showing deployment down a wellbore as a downhole application, and FIG. 4 showing supporting facilities for either environment. In some instances, the DAS deployment may be retrofittable at the well, can reduce operational expenditures with minimal capital expenditures on sensing equipment. Moreover, the DAS deployments can enable increased process efficiency with no utility requirements at the sensing zones.

Referring now to FIGS. 1 and 2 an implementation of an above-surface fiber optic sensor deployment is shown. A series of containers 102 each receive incoming fluid from a wellbore 304 (FIG. 3) or other fluid sources through intake pipes 104. The collected fluid leaves containers through outflow pipes 106, which connect via couplings 108 to a common outflow pipe 110. Common outflow pipe 110 directs fluid downstream for further collection and processing. Various additional components, such as branch pipes, valves, sensors, couplings, processing components or the like as are known in the art may also be present.

A fiber optic cable 202 extends along at least a portion of any desired fluid pipe in the fluid network, including at least intake pipes 104, outflow pipes 106, and/or common outflow pipe 110. Fiber optic cable 202 may extend along a generally straight path for most of its length interspersed by wrapped areas 204 in which the fiber optic cable 202 wraps around a pipe such as common outflow pipe 110. Wrapped areas 204 are shown in FIG. 3 only around common outflow pipe 110 for purposes of illustration, although it is to be understood wrapped areas may be present on any pipe throughout the fluid network. Wrapped areas 204 can include a length of fiber wrapped on the pipe of between 220 meters and 600 meters and can have a wrapped length of between 50 cm and 110 cm.

The far end of fiber optic cable 202 connects to a DAS acquisition unit 210. DAS acquisition unit may be part of supporting facilities 402 of FIG. 4, a standalone unit, or a combination thereof.

Sensors 208 are located at appropriate locations along the fluid flow as needed to measure fluid characteristics at those locations. Sensors 208 may detect any characteristics of the fluid flow, for which non-limiting examples include a pressure sensor, a temperature sensor, multi-phase meter, and/or a well-test separator. Only one sensor 208 is shown in FIG. 2 at a particular location for purposes of illustration, although it is to be understood that many such sensors of appropriate type may be located throughout the fluid network. Sensors 208 may present their information independently (e.g., readout on the sensor itself), report the information to supporting facilities 402, and/or report to some other component entirely.

Flow of fluid in the various pipes that define the fluid pathways will apply strain and vibration to fiber optic cable 202, and in particular at the wrapped areas 204. DAS acquisition unit 210 can measure the corresponding changes to light passing through fiber optic cable 202 and determine characteristics of the fluid flow, including fluid velocity, fluid rate (fluid rate and fluid velocity falling within a broader category of "fluid speed parameters"), and speed of sound through the fluid as a continuous time series.

Non-limiting commercially available examples of fiber optic cable 202 and DAS acquisition unit 210 consistent with the above are sold under the trademarks FIBER-WRAP™ and IDAS™, respectively, by Silixa Ltd. U.S. Pat. No. 10,877,001, which is incorporated herein by reference in its entirety, discloses information about such a cable and DAS, and the types of information that they can provide. However, it will be appreciated that these are examples only and other types of cables and units are contemplated.

Referring now to FIG. 3, a fiber optic cable 302 is deployed down a wellbore 304. A laser 306 at a far end of fiber optic cable 302 emits light that travels up the fiber optic cable. Backscattered light 308 is analyzed by a DAS acquisition unit 210 to produce a variety of measurements of fluid flow. Fiber optic cable 302 may be straight as shown and/or wrap around portions of a pipe such as shown in FIG. 2. A non-limiting example of fiber optic cable 302 is the SILIXA FIBERWRAP.

Referring now to FIG. 4, supporting facilities 402 include a computing device 128. The computing device 128 includes a processor 122, a non-transitory storage medium 124 (e.g., hardware memory), and an internal clock 126. In the exemplary implementation, the DAS acquisition unit 210 is part of supporting facilities 402 and receives information via fiber optic cables 202/302. It will be appreciated that DAS may be independent from or partially overlap with supporting facilities 402 in some examples.

Figure 5:
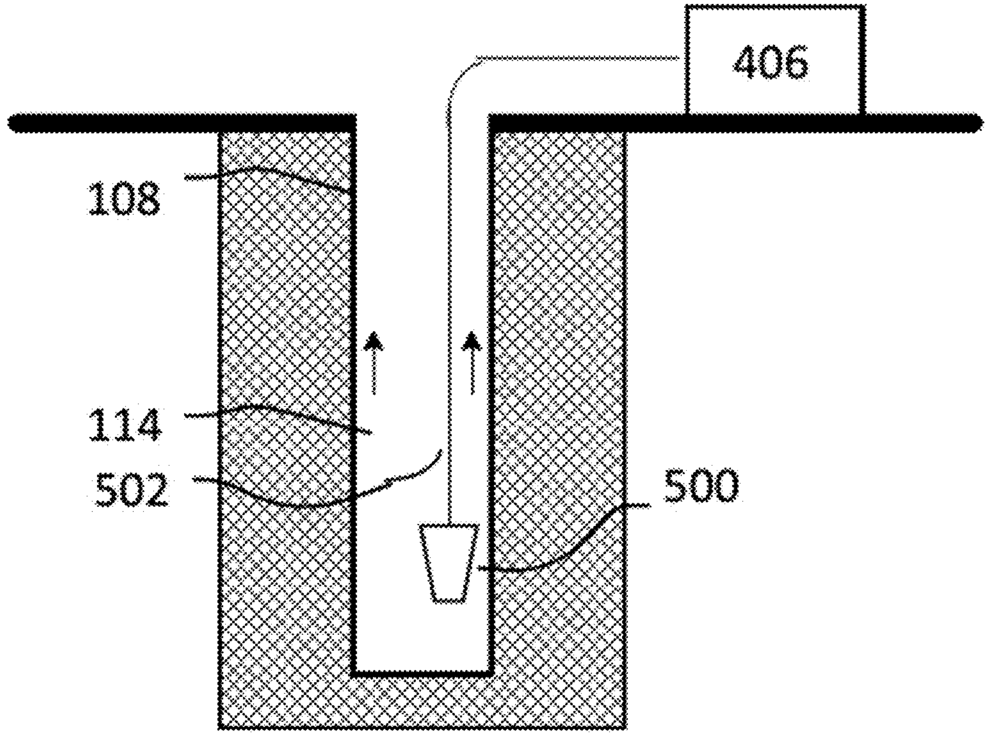
FIG. 5 shows an implementation of a probe deployed down a wellbore.
Figure 6:
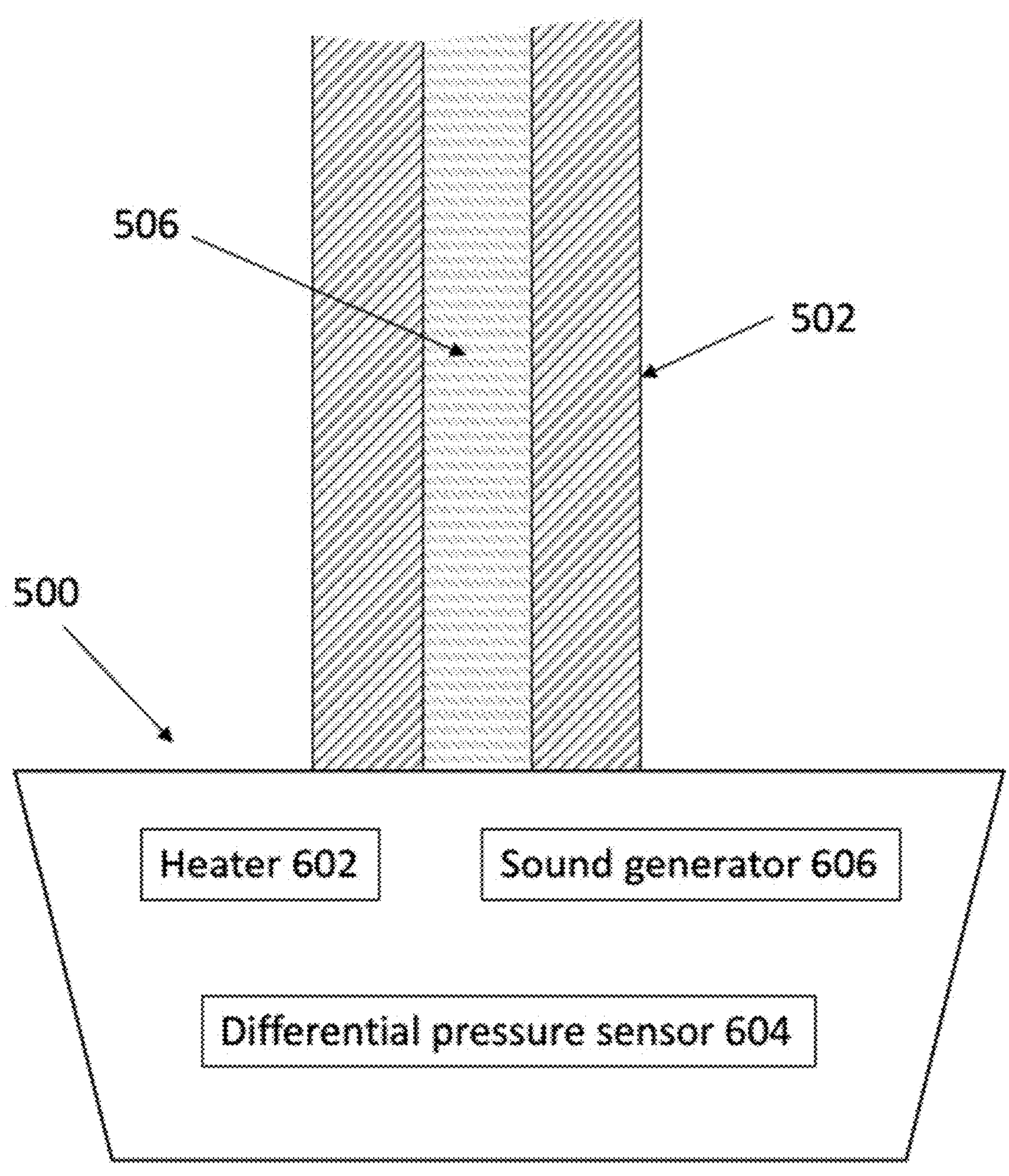
FIG. 6 shows an implementation of components of the probe of FIG. 5.

Referring now to FIGS. 5 and 6, another implementation of a fiber optic sensor deployment is shown. Probe 500 is mounted on the far end of a tool string 502 that connects to a DAS acquisition unit 406 on the surface. Tool string 502 may be conventional wireline, carbon rod or coiled tubing or the like with embedded laser supported fiber optic cable 506 and other electrical cabling as is known in the art. Tool string 502 may be stored and lowered by a drum (not shown) or other similar methodology into the flow stream of wellbore 304 to the desired depth as is known in the art and not further discussed herein.

Probe 300 includes a heater 602, a differential pressure sensor 604, and a sound generator 606. These probe components may before part of a single unit as probe 300. In some examples, probe components of probe 400 may be dispersed in different structures. Control over the probe components may lie in the components themselves, surface sensors, supporting facilities 402, DAS acquisition unit 210, other components, or combinations thereof.

The components of probe 300 and used by DAS acquisition unit 210 to measure the corresponding changes to light passing through fiber optic cable 506 and determine characteristics of the fluid flow, including fluid velocity (from which fluid flow can be estimated) and speed of sound through the fluid as a continuous time series.

The above implementations are non-limiting examples of fiber optic sensor deployments that provide information on flow rate and speed of sound flowing in wells. However, other sensor deployments that provide that information may also be used.

The above implementations are non-limiting examples of fiber optic sensor deployments that provide information on flow rate and speed of sound flowing in wells. However, other sensor deployments that provide that information may also be used.

Machine Learning

Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these.

Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Implementations of the instant Application contemplate use of a neural network type models, although other models may be used Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance. Implementations of the instant Application utilize machine learning to predict the fluid fractions of different content within a multi-phase fluid flow.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule.

Figure 7:
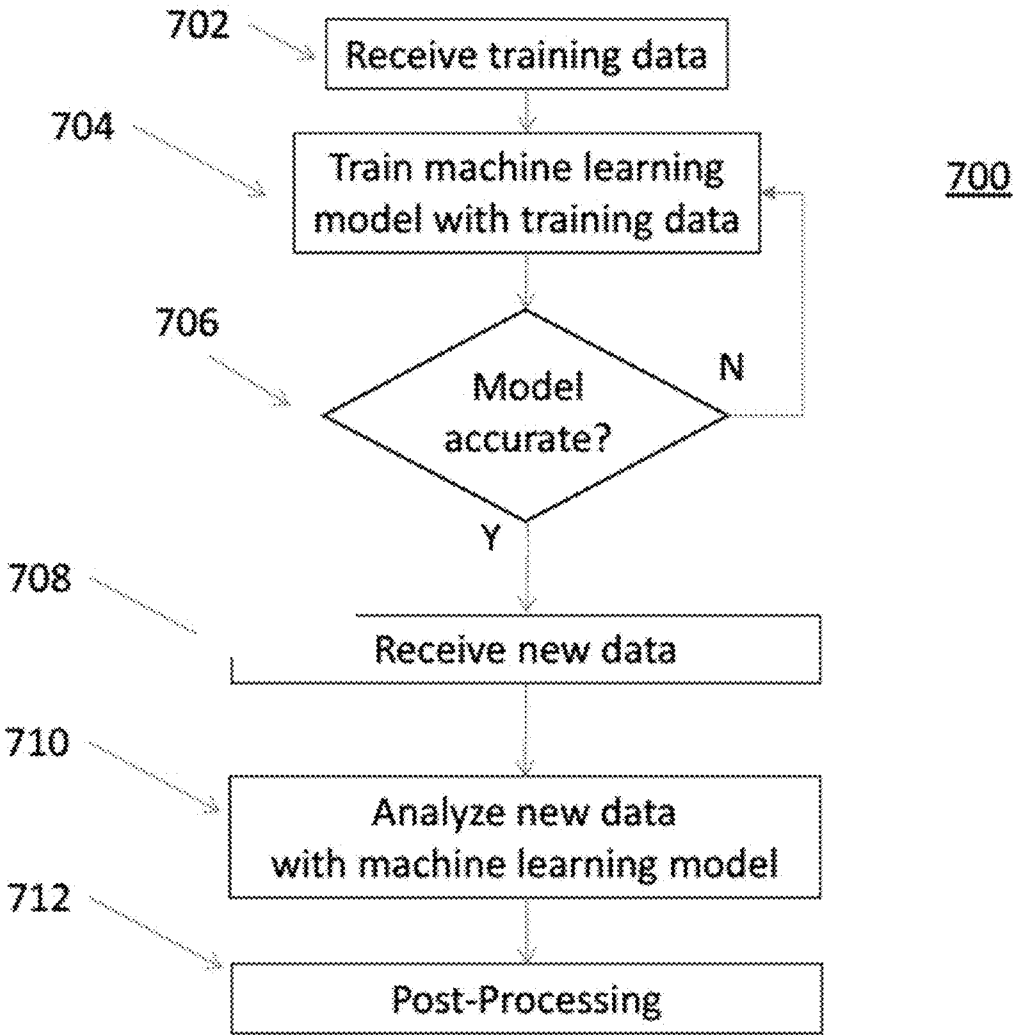
FIG. 7 is a flowchart of an implementation for using machine learning to predict fluid fractions in a fluid flow.

Referring now to FIG. 7, a flow chart 700 of an example of a process for generating and using a machine-learning model according to some aspects.

In block 702, training data is received. In at least some implementations herein, training data may include a fluid speed parameter (e.g., fluid velocity, vortex velocity and/or fluid rate) and speed of sound through the fluid at a particular location as determined by the DAS, as well as pressure and temperature readings for that fluid flow from sensors 408. In some examples, the training data is received from a remote database or a local database, constructed from various subsets of data, or input by a user. The training data can be used in its raw form for training a machine-learning model or pre-processed into another form, which can then be used for training the machine-learning model. The training data can be raw acoustic data which can be saved directly to a redundant array of inexpensive disks (RAID) array in a .h5 prodml format. In some examples, real time computational outputs are saved in csv format via raw data streaming to a process server. Computational outputs for both fluid vortex-based data and speed of sound-based data can be saved from multiple sensor locations on multiple pipes simultaneously. For example, the raw form of the training data can be smoothed, truncated, aggregated, clustered, or otherwise manipulated into another form, which can then be used for training the machine-learning model.

In block 704, a machine-learning model is trained using the training data. In at least some implementations herein, the machine-learning model can be trained in a supervised manner, in which each input in the training data is correlated to a particular output. This particular output may be a scalar, a vector, or a different type of data structure such as text or an image. The output of the machine-learning model can be a target flow rate for a particular fluid, such as a target gas flow rate, a target oil flow rate, a target water flow rate, a target total fluid flow rate, combinations thereof, and the like. For instance, the This may enable the machine-learning model to learn a mapping between the inputs and desired outputs. For example, in at least some implementations herein, the various inputs could be correlated with the fluid fraction measurements from multi-phase flow meters and/or well-test separators. However, training may be unsupervised (the training data includes inputs, but not particular outputs, so that the machine-learning model has to find structure in the inputs on its own) or semi-supervised training (only some of the inputs in the training data are correlated to particular outputs).

In block 706, the machine-learning model is evaluated for accuracy. For example, an evaluation dataset can be obtained, for example, via user input or from a database. The evaluation dataset can include inputs correlated to desired outputs. The inputs can be provided to the machine-learning model, and the outputs from the machine-learning model can be compared to the desired outputs. In at least some implementations, the outputs of the predicted fluid fractions could be compared with the measured fluid fractions from multi-phase flow meters or well-test separators.

If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data. In at least some implementations herein, when the model is complete Applicants have observed an accuracy rate of 92% or greater in fluid fraction predictions In some examples, if the machine-learning model has an inadequate degree of accuracy for a particular task, the process can return to block 704, where the machine-learning model can be further trained using additional training data or otherwise modified to improve accuracy. If the machine-learning model has an adequate degree of accuracy for the particular task, the process can continue to block 708.

In block 708, new data is received. In some examples, the new data is received from a remote database or a local database, constructed from various subsets of data, or input by a user. The new data may be unknown to the machine-learning model. For example, the machine-learning model may not have previously processed or analyzed the new data. In at least some implementations herein, new data may be, for a new fluid flow, current output of DAS acquisition unit 210 (e.g., fluid flow, fluid velocity, and/or speed of sound) and current output of various sensors 208 (e.g., fluid pressure and temperature).

In block 710, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these. In at least some implementations herein, the result is the predicted fluid fractions of fluid flow as monitored at the particular locations by the DAS acquisition unit 210 and surface sensors.

In block 712, the result is post-processed. Post processing can be done in Matlab, for instance to fill gaps from the real-time monitoring and to perform in depth analysis of fluid vortex-based data and speed of sound-based data. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 8:
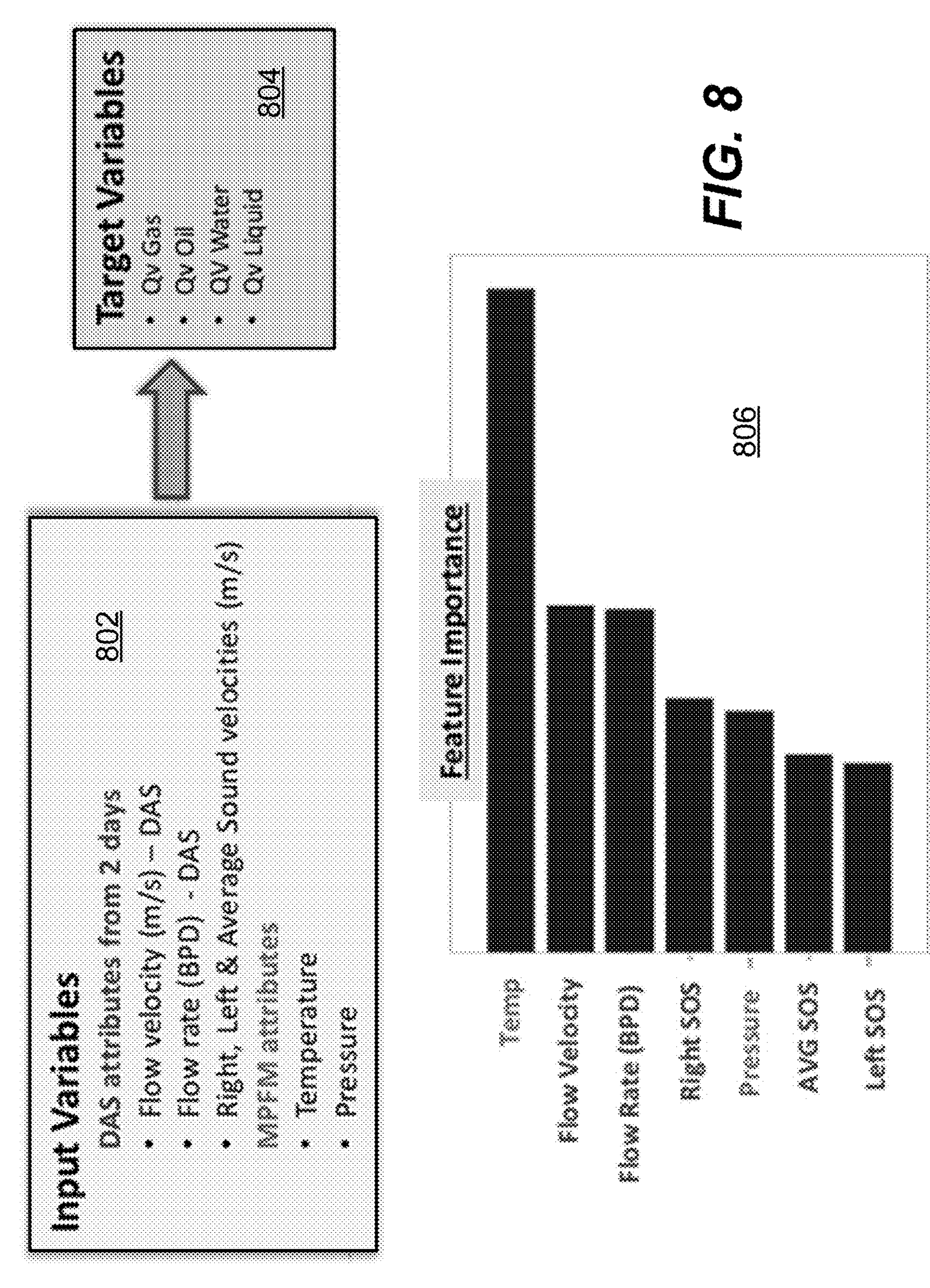
FIG. 8 shows an implementation of a machine-learning model to implement the techniques discussed herein.

Turning to FIG. 8, a block diagram of an example process for generating and using a machine-learning model 800 to determine production variables using DAS deployments is depicted.

In some examples, a machine learning model 800 can receive input variables 802 which can include DAS attributes generated by the DAS Acquisition Unit 210 (e.g., flow velocity in meters per second, flow rate in barrels per day, and a right sound velocity (m/s), a left sound velocity (m/s), and/or an average sound velocity (m/s)). The input variables 802 can also include multi-phase flow meter (MPFM) attributes generated by the MPFM, as well as separator data. The MPFM attributes can be temperatures and/or pressure.

The machine learning model 800 can also include one or more target variables 804, such as a target gas flow rate, a target oil flow rate, a target water flow rate, or a target liquid flow rate. A neural network can be used (e.g., via blocks 702-712 discussed above regarding FIG. 7) to determine correlations between the input variables 804 and the target variables 804. For instance, one or more feature important ratings 806 can be generated to determine a weight or value to be placed on the different input variables 802. An MPFM attribute, such as temperate, can be weighed with a highest importance rating, followed by one or more DAS attributes, (e.g., flow velocity, flow rate (BPD), and/or right speed of sound measurement), the MPFM attribute of pressure, and, the average sound of speed measurement, and the left speed of sound measurement. Of course, it is to be understood that other feature importance ratings 808 can be determined by the machine learning model according to the unique input variables 804.

The above implementations provide a machine learning approach to prediction of fluid fractions in support of improved production allocations, well health checks and production optimizations. These methodologies are far less expensive than flow meters, and provide data at a significantly higher rate than well-test separators.

General Computer Architecture

Various implementations discussed or suggested herein can be implemented in a wide variety of operating environments, which in some cases can include one or more user computers, computing devices, or processing devices which can be used to operate any of a number of applications. User or client devices can include any of a number of general purpose individual computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most implementations utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In implementations where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of implementations, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optic storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate implementations may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optic storage, magnetic cassettes, magnetic tape, magnetic disk storage or other magnetic storage devices, or any other medium which can be used to store the desired information and which can be accessed by a system device. Based on the disclosure and teachings provided herein, an individual of ordinary skill in the art will appreciate other ways and/or methods to implement the various implementations.

The specification and drawings are to be regarded in an illustrative rather than a restrictive sense. It will, however, be evident that various modifications and changes may be made thereunto without departing from the broader spirit and scope as set forth in the claims.

What is claimed is:

1. A method comprising:

deploying at least one section of pipe with a fiber optic cable wrapped around the at least one section of pipe;

measuring, by a temperature sensor, a temperature of a first fluid flow to yield a measured temperature;

measuring, by a pressure sensor, a pressure of the first fluid flow to yield a measured pressure;

first determining, by a distributed acoustic sensing (DAS) device, a fluid speed parameter of the first fluid flow and a speed of sound through the first fluid flow to yield a determined fluid speed parameter and a determined speed of sound;

second determining, by at least one of a well-test separator or a multi-phase sensor, first fluid fractions of the first fluid flow to yield a determined first fluid fractions;

building, from the measured pressure of the first fluid flow, the measured temperature of the first fluid flow, the determined fluid speed parameter of the first fluid flow, the speed of sound through the first fluid flow, and the determined first fluid fractions, a machine learning model programmed to estimate fluid fractions of a fluid flow as a function of at least one DAS fluid flow parameter and at least one physical characteristic of the fluid flow;

receiving data for a second fluid flow, the data including the at least one DAS fluid flow parameter for the second fluid flow and the at least one physical characteristic of the second fluid flow;

determining, using the machine learning model, second fluid fractions of the second fluid flow from at least the at least one DAS fluid flow parameter for the second fluid flow and the at least one physical characteristic of the second fluid flow to yield a determined second fluid fractions; and generating at least one of a production allocation, a well health indication, or a production optimization using the determined second fluid fractions.

2. The method of claim 1, wherein the building comprises:

using, as training data for the machine learning model, at least the measured pressure of a first fluid flow, the measured temperature of the first fluid flow, the determined fluid speed parameter of the first fluid flow, the speed of sound through the first fluid flow; and comparing output of the machine learning model for the training data to the determined first fluid fractions of the first fluid flow from the well-test separator and/or the multi-phase sensor.

3. The method of claim 1, wherein the at least one DAS fluid flow parameter includes a fluid speed parameter of the second fluid flow and speed of sound through the second fluid flow.

4. The method of claim 1, wherein the fluid speed parameter is fluid velocity and/or fluid rate.

5. The method of claim 1, wherein the at least one physical characteristic of the second fluid flow includes a pressure and temperature of the second fluid flow.

6. The method of claim 1, wherein the first determining comprises:

deploying a length of the fiber optic cable along a fluid pathway;

monitoring changes in light through the fiber optic cable induced by movement of the first fluid flow through the fluid pathway; and calculating, from at least the changes, the fluid speed parameter of the first fluid flow and the speed of sound through the first fluid flow.

7. The method of claim 1, wherein the first determining comprises:

deploying a length of the fiber optic cable along at least a portion of a fluid pathway, the length of the fiber optic cable having portions wound around a pipe carrying the first fluid flow;

monitoring changes in light through the fiber optic cable induced by movement of the first fluid flow through the fluid pathway; and calculating, from at least the changes, the fluid speed parameter of the first fluid flow and the speed of sound through the first fluid flow.

8. A system, comprising:
a pressure sensor located in a fluid pathway;
a temperature sensor located in the fluid pathway;
a distributed acoustic sensing (DAS) unit receiving data from at least one fiber optic cable in the fluid pathway and being programmed to calculate a fluid speed parameter of fluid in the fluid pathway and a speed of sound through fluid in the fluid pathway;
at least one of a well-test separator or a multi-phase sensor located in the fluid pathway;
a processor having a combination of electronic computer hardware and software;
a memory storing instructions programmed to cooperate with the processor to perform operations comprising:
building, from a pressure of a first fluid flow from the pressure sensor, a temperature of the first fluid flow from the temperature sensor, a fluid speed parameter of the first fluid flow from the DAS, a speed of sound through the first fluid flow from the DAS, and a first fluid fraction of the first fluid flow from the well-test separator and/or a multi-phase sensor, a machine learning model programmed to estimate fluid fractions of fluid flow as a function of at least one DAS fluid flow parameter and at least one physical characteristic of the fluid flow;
receiving data for a second fluid flow, the data including the at least one DAS fluid flow parameter for the second fluid flow and the at least one physical characteristic of the second fluid flow;
determining, using the machine learning model, second fluid fractions of the second fluid flow from at least the at least one DAS fluid flow parameter for the second fluid flow and the at least one physical characteristic of the second fluid flow; and
generating at least one of a production allocation, a well health indication, or a production optimization using the second fluid fractions.

9. The system of claim 8, wherein the building comprises:
using, as training data for the machine learning model, at least the pressure from the pressure sensor, the temperature from the temperature sensor, the fluid speed parameter from the DAS, the speed of sound from the DAS; and
comparing output of the machine learning model for the training data to the first fluid fractions from the well-test separator and/or the multi-phase sensor.

10. The system of claim 8, wherein the at least one DAS fluid flow parameter includes a fluid speed parameter of the second fluid flow and speed of sound through the second fluid flow.

11. The system of claim 8, wherein the fluid speed parameter is fluid velocity and/or fluid rate.

12. The system of claim 8, wherein the at least one physical characteristic of the second fluid flow includes a pressure and temperature of the second fluid flow.

13. The system of claim 8, further comprising:
a length of fiber optic cable along at least a portion of the fluid pathway;
the DAS unit being programmed to:
monitor changes in light through the fiber optic cable induced by movement of fluid through the fluid pathway; and
calculate, from at least the changes, the fluid speed parameter and the speed of sound.

14. The system of claim 8, wherein the first determining comprises:
a length of fiber optic cable along at least a portion of the fluid pathway, the length of the cable having portions wound around a pipe of the fluid pathway;
the DAS unit being programmed to:
monitor changes in light through the fiber optic cable induced by movement of fluid through the fluid pathway; and
calculate, from at least the changes, the fluid speed parameter and the speed of sound.

15. One or more tangible non-transitory computer-readable storage media storing computer-executable instructions for performing a computer process on a computing system, the computer process comprising:
measuring a pressure of a first fluid flow to yield a measured pressure;
measuring a temperature of the first fluid flow to yield a measured temperature;
determining, by distributed acoustic sensing (DAS), a fluid speed parameter of the first fluid flow and a speed of sound through the first fluid flow to yield a determined fluid speed parameter and a determined speed of sound;
determining, by at least one of a well-test separator or a multi-phase sensor, first fluid fractions of the first fluid flow to yield a determined first fluid fractions;
building, from the measured pressure of a first fluid flow, the measured temperature of the first fluid flow, the determined fluid speed parameter of the first fluid flow, the speed of sound through the first fluid flow, and the determined first fluid fractions, a machine learning model programmed to estimate fluid fractions of a fluid flow as a function of at least one DAS fluid flow parameter and at least one physical characteristic of the fluid flow;
receiving data for a second fluid flow, the data including the at least one DAS fluid flow parameter for the second fluid flow and the at least one physical characteristic of the second fluid flow;
determining, using the machine learning model, second fluid fractions of the second fluid flow from at least the at least one DAS fluid flow parameter for the second fluid flow and the at least one physical characteristic of the second fluid flow to yield a determined second fluid fractions; and
generate at least one of a production allocation, a well health indication, or a production optimization using at least one of the determined first fluid fractions or the determined second fluid fractions.

16. The one or more tangible non-transitory computer-readable storage media of claim 15, wherein the building comprises:
using, as training data for the machine learning model, at least the measured pressure of a first fluid flow, the measured temperature of the first fluid flow, the determined fluid speed parameter of the first fluid flow, the speed of sound through the first fluid flow; and
comparing output of the machine learning model for the training data to the determined first fluid fractions of the first fluid flow from the well-test separator and/or the multi-phase sensor.

17. The one or more tangible non-transitory computer-readable storage media of claim 15, wherein the at least one DAS fluid flow parameter includes a fluid speed parameter of the second fluid flow and speed of sound through the second fluid flow.

18. The one or more tangible non-transitory computer-readable storage media of claim 15, wherein the fluid speed parameter is fluid velocity and/or fluid rate.

19. The one or more tangible non-transitory computer-readable storage media of claim 15, wherein the at least one physical characteristic of the second fluid flow includes a pressure and temperature of the second fluid flow.

20. The one or more tangible non-transitory computer-readable storage media of claim 15, wherein the determining the fluid speed parameter of the first fluid flow comprises:

monitoring changes in light through a fiber optic cable induced by movement of the first fluid flow through a fluid pathway; and calculating, from at least the changes, the fluid speed parameter of the first fluid flow and the speed of sound through the first fluid flow.

* * * * *